(12) United States Patent
Hill et al.

(10) Patent No.: US 11,325,359 B2
(45) Date of Patent: May 10, 2022

(54) PARTIALLY PERFORATED ASSEMBLY

(71) Applicant: CONTRA VISION LTD., Stockport (GB)

(72) Inventors: George Roland Hill, Stockport (GB); Mark David Godden, Cahuzac (FR)

(73) Assignee: CONTRA VISION LTD., Bramhall (GB)

( * ) Notice: Subject to any disclaimer, the term of this patent is extended or adjusted under 35 U.S.C. 154(b) by 60 days.

(21) Appl. No.: 16/346,323

(22) PCT Filed: Oct. 31, 2017

(86) PCT No.: PCT/IB2017/056763
§ 371 (c)(1),
(2) Date: Apr. 30, 2019

(87) PCT Pub. No.: WO2018/078608
PCT Pub. Date: May 3, 2018

(65) Prior Publication Data
US 2019/0299577 A1    Oct. 3, 2019

Related U.S. Application Data

(60) Provisional application No. 62/415,104, filed on Oct. 31, 2016.

(51) Int. Cl.
*B32B 27/10* (2006.01)
*B32B 3/00* (2006.01)
(Continued)

(52) U.S. Cl.
CPC .............. *B32B 27/10* (2013.01); *B32B 3/266* (2013.01); *B32B 3/30* (2013.01); *B32B 5/022* (2013.01);
(Continued)

(58) Field of Classification Search
CPC ....... B29C 2793/0045; B32B 2038/047; Y10T 156/1056
See application file for complete search history.

(56) References Cited

U.S. PATENT DOCUMENTS

| 4,925,705 A | 5/1990 | Hill |
| 5,650,215 A | 7/1997 | Mazurek et al. |

(Continued)

FOREIGN PATENT DOCUMENTS

| EP | 2103443 A1 | 9/2009 | |
| WO | WO-2013175298 A1 * | 11/2013 | ............. B44F 1/00 |

OTHER PUBLICATIONS

International Search Report and Written Opinion of the International Searching Authority in related International Patent Application No. PCT/IB2017/056763, 14 pages, dated Mar. 6, 2018.

(Continued)

*Primary Examiner* — Linda L Gray
(74) *Attorney, Agent, or Firm* — Pillsbury Winthrop Shaw Pittman LLP

(57) ABSTRACT

A partially perforated assembly includes a perforated film layer, a perforated adhesive layer applied to one side of said film layer, a non-perforated overlaminate film layer on the other side of said perforated film layer, and a release liner on the side of said perforated adhesive layer remote from said perforated film layer. When the release liner is removed and the remaining layers of the assembly are applied to a substrate, the remaining layers of the assembly comprise a void network. The void network fluidly interconnects at least two discrete perforation holes in the perforated film and adhesive layers with each other and/or the ambient environment around the assembly so as to facilitate air communication among the holes and/or between the holes and the ambient environment.

29 Claims, 8 Drawing Sheets

(51) Int. Cl.

| | | |
|---|---|---|
| B32B 5/00 | (2006.01) | |
| B32B 7/06 | (2019.01) | |
| B32B 29/02 | (2006.01) | |
| B32B 38/04 | (2006.01) | |
| B32B 3/26 | (2006.01) | |
| B32B 3/30 | (2006.01) | |
| B32B 5/02 | (2006.01) | |
| B32B 5/18 | (2006.01) | |
| B32B 7/12 | (2006.01) | |
| B32B 27/06 | (2006.01) | |
| B32B 27/12 | (2006.01) | |
| B32B 27/30 | (2006.01) | |
| B32B 27/36 | (2006.01) | |
| B32B 38/00 | (2006.01) | |
| B44C 1/10 | (2006.01) | |
| B44C 1/24 | (2006.01) | |
| B44F 1/00 | (2006.01) | |

(52) U.S. Cl.
CPC ............... *B32B 5/024* (2013.01); *B32B 5/18* (2013.01); *B32B 7/06* (2013.01); *B32B 7/12* (2013.01); *B32B 27/065* (2013.01); *B32B 27/12* (2013.01); *B32B 27/304* (2013.01); *B32B 27/36* (2013.01); *B32B 29/02* (2013.01); *B32B 38/04* (2013.01); *B32B 38/145* (2013.01); *B44C 1/105* (2013.01); *B44C 1/24* (2013.01); *B44F 1/00* (2013.01); B29C 2793/0045 (2013.01); B32B 2038/047 (2013.01); B32B 2307/102 (2013.01); B32B 2307/4023 (2013.01); B32B 2307/412 (2013.01); B32B 2451/00 (2013.01); B32B 2590/00 (2013.01); B32B 2605/006 (2013.01); Y10T 156/1056 (2015.01); Y10T 156/1057 (2015.01)

(56) References Cited

U.S. PATENT DOCUMENTS

| | | |
|---|---|---|
| 5,858,155 A | 1/1999 | Hill et al. |
| 6,212,805 B1 | 4/2001 | Hill |
| RE37,186 E | 5/2001 | Hill |
| 2009/0220750 A1 | 9/2009 | Hill et al. |
| 2014/0141197 A1 | 5/2014 | Hill et al. |

OTHER PUBLICATIONS

International Preliminary Report on Patentability issued in related International Patent Application No. PCT/IB2017/056763 dated Oct. 16, 2018, 19 pages.

\* cited by examiner

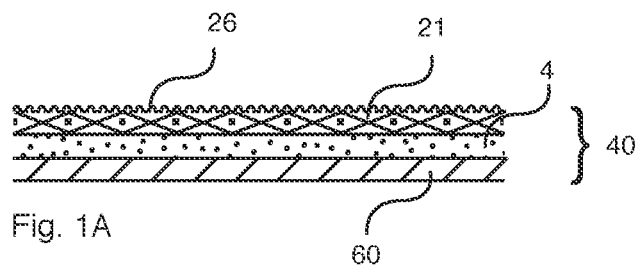
Fig. 1A
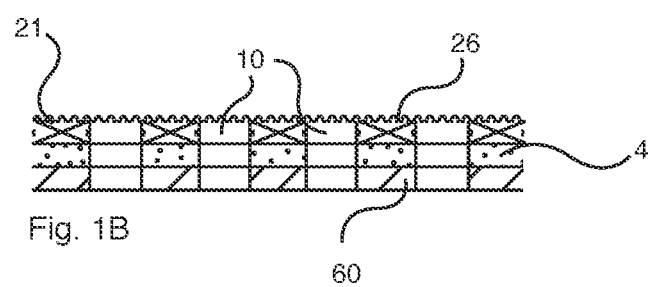
Fig. 1B
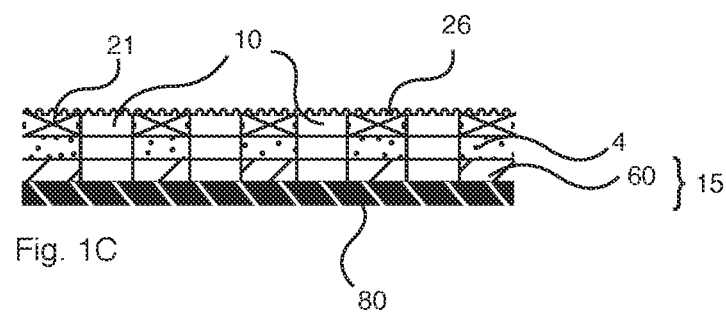
Fig. 1C
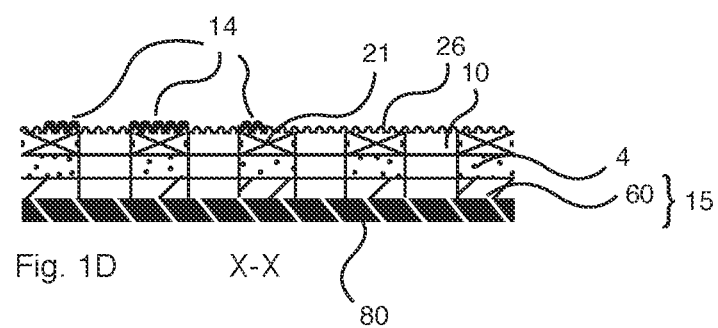
Fig. 1D    X-X
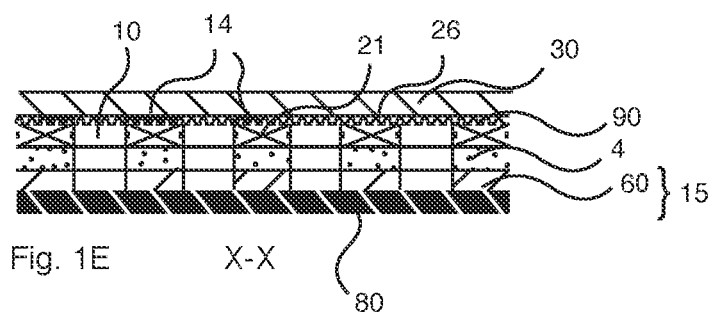
Fig. 1E    X-X

PARTIALLY PERFORATED ASSEMBLY

CROSS-REFERENCE TO RELATED APPLICATIONS

This application is a National Stage of PCT/IB2017/056763, filed Oct. 31, 2017, and designating the United States (published in English on May 3, 2018, as WO 2018/078608 A1), which claims priority to U.S. Provisional Application No. 62/415,104, filed Oct. 31, 2016, each hereby expressly incorporated by reference in its entirety and each assigned to the assignee hereof.

This Application claims priority to U.S. Provisional Patent Application 62/415,104, filed Oct. 31, 2016, the subject matter of which is incorporated herein by reference in entirety.

BACKGROUND

1. Field of the Invention

Various embodiments relate generally to perforated film assemblies with a non-perforated overlaminate.

2. Description of Related Art

Self-adhesive assemblies comprising a face film, an adhesive layer and a release liner are well known.

Perforated window films are known, for example as disclosed in US RE 37,186 and U.S. Pat. No. 6,212,805, typically comprising a perforated face film, a perforated pressure-sensitive adhesive layer, and a perforated release liner, optionally comprising a non-perforated additional liner applied to the perforated liner.

A method of making a perforated assembly with a non-perforated replacement release liner, which is applied to the perforated adhesive layer after removal of the perforated liner, is disclosed in U.S. Pat. No. 5,858,155.

Non-perforated overlaminates to perforated adhesive assemblies are known, typically of pvc or polyester film.

Non-perforated, self-adhesive vinyl assemblies with an embossed, non-planar surface are known, typically used for decorative purposes, for example as manufactured by Omnova Solutions, Inc., US.

Sound absorption panels are known comprising a perforated face material and a fibrous core material or foamic materials, typically having a non-planar, deformed surface.

SUMMARY

The application of non-perforated self-adhesive vinyl films to a substrate, for example to a window or vehicle body, commonly results in the formation of undesirable air bubbles between the adhesive and the substrate, which are often difficult to remove by squeegeeing or roller application. Non-perforated self-adhesive vinyl assemblies are known, that comprise a release liner with an embossed pattern, for example as disclosed in U.S. Pat. No. 5,650,215. A raised embossed pattern on the release liner results in a depressed or recessed pattern within the adhesive layer. Upon removal of the release liner and application of the remaining layers of the assembly to a substrate, for example a vehicle body, this depressed or recessed pattern forms a continuous air escape route, enabling air bubbles which form between the self-adhesive vinyl and the substrate to which it is being attached to be removed by squeegeeing to the edges of the self-adhesive vinyl panel.

The problem typically does not arise with perforated adhesive assemblies without an overlaminate, as any trapped air can easily escape via an adjacent perforation hole.

It is known to overlaminate a perforated film, optionally after imaging the perforated film, for example to form a one-way vision or other see-through graphic assembly. An overlaminate film is applied for a variety of reasons, for example to avoid rain entering the perforation holes, which affects through vision, and/or to protect the imaged surface from abrasion or environmental damage.

Even if a non-perforated overlaminate is applied to a perforated film layer, the air in the perforation holes typically accommodates any additional air trapped in the application process with increased air pressure in the perforation holes. This typically slight increase in air pressure in the holes is dissipated through the face film and/or the adhesive strength in the non-perforated portions is sufficient to retain the assembly in position.

Differential thermal expansion of glass windows caused by window graphics is known, for example if a panel has been imaged with adjacent areas of ink of substantially different reflectivity, for example a black or other dark, radiation-absorbing ink adjacent to a white or other light-reflective area of ink. It is known that differential thermal expansion of adjacent areas of glass has initiated glass breakage. Solar heating of air in the voids raises air pressure, risking delamination, and also causes conduction of heat into the building from the air holes, which wind or other causes of air movement adjacent to the glass cannot dissipate.

Glass and other materials with hard, plane surfaces reflect a high proportion of sound energy, which can be a cause of irritation, even physical discomfort, and prevent hearing, for example of relatively quiet conversation. Methods of absorbing sound on vertical surfaces are well known, including hanging drapes, curtains and other fabrics, hanging carpets, sound absorptive panels, for example comprising fibrous material retained by a surface perforated material or foam acoustic panels, the incident sound energy being partially converted to other forms of energy, for example heat energy, resulting in a proportion of incident sound being absorbed and not reflected. Sound energy is either reflected from, is absorbed in, or is transmitted through a panel such as a glass building partition. The sound absorption coefficient of a particular material or construction is the sound intensity absorbed divided by the incident sound intensity and is dependent upon the sound frequency. For example, at 1 kHz, the sound absorption coefficient of a glass sheet is of the order of 0.03 and that of acoustic tiles is typically between 0.4 and 0.8.

In view of the above, one or more non-limiting embodiments provide a partially perforated assembly comprising: a perforated film layer; a perforated adhesive layer applied to one side of said film layer; a non-perforated overlaminate film layer on the other side of said perforated film layer; and a release liner on the side of said perforated adhesive layer remote from said perforated film layer. The assembly is structured such that when the release liner is removed from the adhesive layer and the remaining layers of the assembly are adhered to a substrate by said adhesive layer, an interconnected void network within at least one of said remaining layers of said assembly allows the passage of air from one perforation in said film layer and said adhesive layer to another perforation in said film layer and said adhesive layer.

According to one or more of these embodiments, one of said layers includes an embossed surface.

According to one or more of these embodiments, the void network is disposed between two layers of the assembly.

According to one or more of these embodiments, the void network fluidly interconnects the at least two discrete perforation holes with a side edge of the assembly.

According to one or more of these embodiments, the void network is located within the depth of one of the layers.

According to one or more of these embodiments, the void network is located within the depth of the perforated film layer.

According to one or more of these embodiments, the void network is formed by the use of an embossed roller in the manufacture of the perforated film layer.

According to one or more of these embodiments, the void network is formed by the use of an embossed roller in the manufacture of the perforated film layer prior to its perforation.

According to one or more of these embodiments, the assembly includes the void network, and said void network is formed between two of the layers and/or within at least one of the layers.

According to one or more of these embodiments, the assembly is structured such that when the release liner is removed from the adhesive layer and the remaining layers of the assembly are adhered to the substrate, the void network is formed in the depth of the perforated adhesive layer between the perforated adhesive layer and the substrate.

According to one or more of these embodiments, the release liner includes an embossed release liner, and wherein the perforated adhesive layer includes a perforated, pressure-sensitive embossed adhesive layer.

According to one or more of these embodiments, the perforated adhesive layer includes a perforated, pressure-sensitive adhesive layer, and the void network includes a depression in the pressure-sensitive adhesive layer.

According to one or more of these embodiments, the depression in the pressure-sensitive adhesive layer is created by coating adhesive onto an embossed release liner and then applying the adhesive-coated release liner to the perforated film layer, and perforating the resulting assembly.

According to one or more of these embodiments, the assembly also includes an additional non-perforated liner applied to the perforated release liner.

According to one or more of these embodiments, the release liner is perforated, and the depression in the pressure-sensitive adhesive layer was created by removing a perforated release liner from the pressure-sensitive adhesive layer, and applying an embossed non-perforated release liner to the perforated adhesive layer.

According to one or more of these embodiments, the perforated film layer material includes a void network.

According to one or more of these embodiments, the perforated film layer includes a fibrous non-woven material.

According to one or more of these embodiments, the perforated film layer includes a woven material.

According to one or more of these embodiments, the perforated film layer includes a cellular material with inter-connected cells.

According to one or more of these embodiments, the perforated film layer includes an acoustic foam material.

According to one or more of these embodiments, the perforated film layer is imaged with a design.

According to one or more of these embodiments, the assembly is a one-way vision assembly.

According to one or more of these embodiments, the design includes a see-through graphic upon removal of the release liner.

According to one or more of these embodiments, the overlaminate film layer includes an adhesive layer adhered to the perforated film layer or an image on the perforated film layer.

According to one or more of these embodiments, the assembly is made by: (i) perforating a film layer and adhesive layer to form said perforated film layer and said perforated adhesive layer, and subsequently (ii) applying the non-perforated overlaminate film layer to a side of the perforated film layer remote from the perforated adhesive layer.

According to one or more of these embodiments, the assembly is made by: (i) perforating a film layer and an adhesive layer to form said perforated film layer and said perforated adhesive layer, and subsequently (ii) applying the non-perforated overlaminate film layer to a side of the perforated film layer remote from the perforated adhesive layer.

According to one or more of these embodiments, the assembly includes a void network disposed between two layers of the assembly, the void network fluidly interconnecting at least two discrete perforation holes in the perforated film and adhesive layers.

According to one or more of these embodiments, the method also includes embossing a surface of one of the layers to form an embossed surface on one of the layers before said applying of the non-perforated overlaminate film layer; and subsequently attaching the non-perforated overlaminate film layer to the perforated film layer.

According to one or more of these embodiments, said embossing the surface of one of the layers includes embossing the film layer, either before or after the film layer is perforated to form the perforated film layer, and in the assembly, the void network is located within the depth of the perforated film layer.

According to one or more of these embodiments, said embossing includes using an embossing roller to emboss the surface of the one of the layers.

According to one or more of these embodiments, said embossing includes using an embossed release liner to form depressions in the perforated adhesive layer.

According to one or more of these embodiments, said embossing includes using an embossed release liner to form depressions in the adhesive layer before the adhesive layer is perforated to form the perforated adhesive layer.

According to one or more of these embodiments, said using of an embossed release liner to form depressions in the adhesive layer includes coating adhesive onto the embossed release liner to form depressions in the adhesive layer.

According to one or more of these embodiments, the release liner of the assembly includes the embossed release liner.

According to one or more of these embodiments, the method also includes perforating the embossed release liner, the film layer, and the adhesive layer as a unit to form the perforated adhesive layer, the perforated film layer, and a perforated embossed release liner.

According to one or more of these embodiments, the method also includes attaching a non-perforated additional liner to the perforated embossed release liner to form the release liner of the assembly.

According to one or more of these embodiments, the assembly includes an air-permeable film layer providing said inter-connected void network.

According to one or more of these embodiments, said air-permeable film layer includes a sound-absorptive material.

According to one or more of these embodiments, said sound-absorptive material is fibrous.

According to one or more of these embodiments, said sound-absorptive material is an acoustic foam material.

One or more embodiments provides a method of forming a partially perforated assembly, the method including: perforating a pre-assembly comprising a film layer and release liner adhered to opposite sides of an adhesive layer to form a perforated film layer, a perforated adhesive layer, and a perforated release liner; and applying a non-perforated overlaminate film layer to a side of the perforated film layer remote from the perforated adhesive layer, wherein the partially perforated assembly is structured such that when the release liner is removed from the perforated adhesive layer and the remaining layers of the partially perforated assembly are adhered to a substrate by said adhesive layer, an inter-connected void network within at least one of said remaining layers of said assembly allows the passage of air from one perforation in said film layer and said adhesive layer to another perforation in said film layer and said adhesive layer.

In one or more non-limiting embodiments, one of said face film and said release liner includes an embossed surface.

In a first type of embodiment, the void network is located within the depth of surface protrusions in the film layer, for example created by the use of an embossed roller in the manufacture of the film layer prior to its perforation.

In a second type of embodiment, the void network is located within the depth of the adhesive layer. For example, the assembly includes a perforated, pressure-sensitive adhesive layer in which the void network is created by the use of an embossed release liner which is removed from the adhesive layer before application of the remaining layers to the substrate. The void network depression in the pressure-sensitive adhesive layer is typically either created by:
  (i) the adhesive being coated onto an embossed release liner and then applied to a face film layer, the resulting assembly then being perforated, or
  (ii) a perforated self-adhesive assembly is perforated, the perforated release liner is removed and an embossed non-perforated release liner is applied to the perforated adhesive layer, optionally by the use of a nip roller.

Optionally the assembly of method (i) has an additional non-perforated liner applied to the perforated release liner.

In a third type of embodiment, the void network is created within the film layer, for example a non-woven fibrous material or a woven material or an inter-connected cellular material, or other material comprising inter-connected voids.

The film layer optionally is a sound absorptive material. A sound-absorptive material according to various embodiments includes one that through deformation or frictional interaction of fibres converts sound energy to another form of energy, typically including heat energy. In various embodiments, sound is also absorbed through the mass transfer of air and the friction between moving air and the surfaces of the inter-connected void network.

The void network includes and inter-connects perforation holes in the perforated film layer and perforated adhesive layer.

Optionally, the perforated film layer is imaged with a design before applying the overlaminate, for example to form a one-way vision or other see-through graphic after removal of the release liner and application to a window, a glass partition, or other transparent material.

Optionally, the overlaminate includes an adhesive layer adhered to the film layer or any image on the film layer, for example a pressure-sensitive adhesive or a heat-bonded adhesive.

Various embodiments are useful in a variety of applications, some examples of which are illustrated herein.

One or more embodiments provides a partially perforated assembly that includes: a perforated film layer; a perforated adhesive layer applied to one side of said film layer; a non-perforated overlaminate film layer on the other side of said perforated film layer; and a release liner on the side of said perforated adhesive layer remote from said perforated film layer, wherein one of said layers includes an embossed surface.

According to one or more of these embodiments, the assembly includes a void network disposed between two layers of the assembly, the void network fluidly interconnecting at least two discrete perforation holes in the perforated film and adhesive layers.

According to one or more of these embodiments, the void network fluidly interconnects the at least two discrete perforation holes with a side edge of the assembly.

According to one or more of these embodiments, the void network is located within the depth of the perforated film layer.

According to one or more of these embodiments, the void network is formed by the use of an embossed roller in the manufacture of the perforated film layer.

According to one or more of these embodiments, the void network is formed by the use of an embossed roller in the manufacture of the perforated film layer prior to its perforation.

According to one or more of these embodiments, the release liner is capable of removal from the adhesive layer. Upon removal of the release liner and application of the remaining assembly to a substrate, a void network is disposed in the depth of the perforated adhesive layer between the perforated adhesive layer and the substrate, the void network fluidly interconnecting at least two discrete perforation holes in the perforated film and adhesive layers.

According to one or more of these embodiments, the perforated adhesive layer includes a perforated, pressure-sensitive adhesive layer in which the void network is created by the use of an embossed release liner which is configured to be removed from the adhesive layer before application of the remaining assembly to the substrate.

According to one or more of these embodiments, the perforated adhesive layer includes a perforated, pressure-sensitive adhesive layer, and the void network includes a depression in the pressure-sensitive adhesive layer.

According to one or more of these embodiments, the depression in the pressure-sensitive adhesive layer is created by the adhesive being coated onto an embossed release liner and then applied to the perforated film layer, the resulting assembly then being perforated.

According to one or more of these embodiments, the assembly also includes an additional non-perforated liner applied to the perforated release liner.

According to one or more of these embodiments, the release liner is perforated, and the depression in the pressure-sensitive adhesive layer was created by removing a perforated release liner from the pressure-sensitive adhesive layer, and applying an embossed non-perforated release liner to the perforated adhesive layer.

According to one or more of these embodiments, the film layer material includes a void network.

According to one or more of these embodiments, the film layer includes a fibrous non-woven material.

According to one or more of these embodiments, the film layer includes a woven material.

According to one or more of these embodiments, the film layer comprises a cellular material with inter-connected cells.

According to one or more of these embodiments, the perforated film layer is imaged with a design.

According to one or more of these embodiments, the assembly comprises a one-way vision assembly.

According to one or more of these embodiments, the design comprises a see-through graphic upon removal of the release liner.

According to one or more of these embodiments, the overlaminate film layer comprises an adhesive layer adhered to the perforated film layer or an image on the perforated film layer.

One or more embodiments provide a method of providing or making such an assembly. For example, one or more embodiments provide a method of providing or making a partially perforated assembly, the assembly comprising a perforated film layer, a perforated adhesive layer applied to one side of said film layer, a non-perforated overlaminate film layer on the other side of said perforated film layer, and a release liner on the side of said perforated adhesive layer remote from said perforated film layer.

According to one or more of these embodiments, the method includes: embossing a surface of one of the layers to form an embossed surface on one of the layers; and attaching the non-perforated overlaminate film layer to the perforated film layer to form the assembly.

According to one or more of these embodiments, the assembly comprises a void network disposed between two layers of the assembly, the void network fluidly interconnecting at least two discrete perforation holes in the perforated film and adhesive layers.

According to one or more of these embodiments, said embossing the surface of one of the layers comprises embossing a film layer, either before or after the film layer is perforated to form the perforated film layer. In the assembly, the void network is located within the depth of the perforated film layer.

According to one or more of these embodiments, said embossing comprises using an embossing roller to emboss the surface of the one of the layers.

According to one or more of these embodiments, said embossing comprises using an embossed release liner to form depressions in the perforated adhesive layer.

According to one or more of these embodiments, said embossing comprises using an embossed release liner to form depressions in the adhesive layer before the adhesive layer is perforated to form the perforated adhesive layer.

According to one or more of these embodiments, said using of an embossed release liner to form depressions in the adhesive layer comprises coating adhesive onto the embossed release liner to form depressions in the adhesive layer.

According to one or more of these embodiments, the release liner of the assembly comprises the embossed release liner.

According to one or more of these embodiments, the method also includes perforating the embossed release liner, a film layer, and the adhesive layer as a unit to form the perforated adhesive layer and perforated film layer of the assembly.

According to one or more of these embodiments, the method also includes attaching a non-perforated additional liner to the perforated embossed release liner to form the release liner of the assembly.

According to one or more of these embodiments, the method also includes perforating an assembly comprising a film layer, an adhesive layer and a release liner, removing the perforated liner and applying an embossed, non-perforated liner to the exposed adhesive surface.

According to one or more of these embodiments, the method also includes a perforated film layer material comprising a void network.

According to one or more of these embodiments, the method also includes a perforated film layer material comprising a non-woven fibrous material.

According to one or more of these embodiments, the method also includes a perforated film layer material comprising a woven material.

According to one or more of these embodiments, the method also includes a perforated film layer material comprising a cellular material with inter-connected cells.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc.

BRIEF DESCRIPTION OF THE DRAWINGS

For a better understanding of various embodiments as well as other objects and further features thereof, reference is made to the following description which is to be used in conjunction with the accompanying drawings, where:

FIGS. 1A-H are diagrammatic cross-sections of the stages in production of a partially perforated assembly Type 1.

FIGS. 2A, 2C and 2E-2I are diagrammatic cross-sections of the stages in production of a partially perforated assembly Type 2 made by method (i).

DETAILED DESCRIPTION OF EXEMPLARY EMBODIMENTS

Figure 1F:
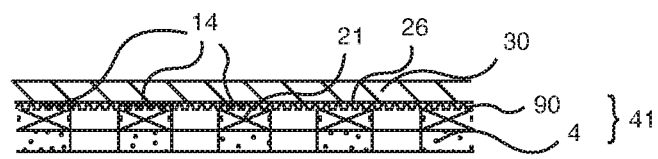
Figure 1G:
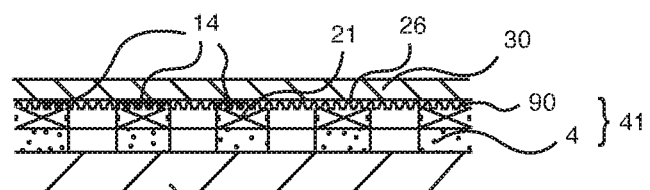
Figure 1H:
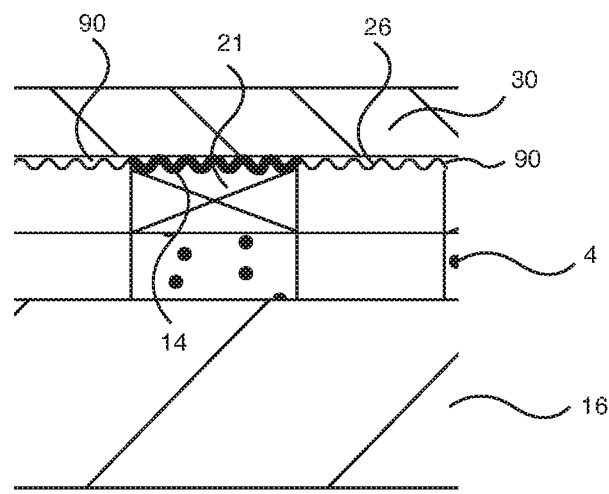
Figure 1I:
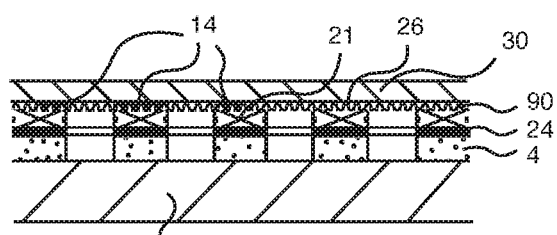
FIG. 1I is a diagrammatic illustration of a one-way vision panel of Type 1.

FIG. 1A illustrates a self-adhesive assembly 40 comprising film layer 21 with a surface topography, for example embossed film layer 21 with embossed imaging surface 26, a pressure-sensitive adhesive layer 4 and a release liner 60. For example, film layer 21 is a plastic, for example polyvinyl chloride (pvc), which has been embossed with discrete raised projections, for example by an embossing roller comprising an embossing cylinder with depressions corresponding to the raised projections in film layer 21. The raised embossed projections are typically of substantially uniform height, typically 10-50 micron height, preferably with a relatively flat, truncated top, to allow the subsequent application of a substantially plane-surfaced overlaminate with sufficient contact area to create an adequate bond between the two layers. The discrete raised projections are optionally of regular geometric form for example truncated pyramids or truncated cones, in a regular or irregular layout, for example in a square grid or random layout, or are of irregular geometric form in a regular or irregular layout. Adhesive layer 4 is optionally a solvent acrylic-based pressure-sensitive adhesive and release liner 60 is optionally a paper liner with a release surface optionally comprising a silicone coating. In FIG. 1B, perforation holes 10 are formed throughout the assembly, for example by punch perforation or laser. Perforation holes are typically 1.0 mm to 3.0 mm diameter with a pvc plastic film layer 21. FIG. 1C illustrates optional additional liner 80 applied to perforated release liner 60 to form composite liner 15. FIG. 1D shows optional design layer 14 applied to the perforated film layer 21, for example by inkjet printing, screen printing or litho printing. In FIG. 1E, overlaminate 30, for example of pvc or polyester, typically 50-300 micron thick, is applied to film layer 21, for example by a layer of pressure-sensitive adhesive or heat-activated adhesive. Void network 90 is created by the space between the overlaminate 30 and the embossed film layer 21 inter-connecting with holes 10. The void network 90 is shown to larger scale in diagrammatic cross-section FIG. 1H. The void network 90 allows the passage of air. The remaining assembly 41 of FIG. IF is optionally applied to substrate 16 following removal of release liner 60 or composite release liner 15, as shown in FIG. 1G and FIG. 1H. Substrate 16 is optionally a sheet or filmic material, for example metal, plastic or another material comprising natural materials or composites thereof. Substrate 16 is optionally transparent, for example to form a one-way vision or other see-through graphic assembly, for example on a glass or plastic sheet material, for example of acrylic, polycarbonate or pvc, for example a window or transparent partition. The film layer and imaging are capable of forming vision control panels according, for example, to US RE37,186 and/or U.S. Pat. No. 6,212,805. For example, FIG. 1I is similar to FIG. 1G except that the initial film layer and subsequent processing comprises a black or other light-absorbing layer or coating 24, for example a layer of black pvc or black ink bonded to a white pvc layer 21, to form a one-way vision panel according to US RE37,186. Optionally, film layer 23 is a much thicker material, for example a conventional sound absorption material, for example a foam panel with surface projections, for example of continuous "wedges" or truncated pyramids or cones, sometimes referred to as an "egg crate" surface topography. Sound waves are partially reflected from the overlaminate 30 and partially transmitted through the overlaminate 30, the transmitted sound energy being partially absorbed. Acoustic foam is an open celled foam used for acoustic treatment. It attenuates airborne sound waves by increasing air resistance, thus reducing the amplitude of the waves. The energy is typically dissipated as heat. It is optionally a lightweight material made from polyurethane foam, either polyether or polyester, or extruded melamine foam. Such acoustic film layer 23 products optionally are foams of thickness from 1 mm to 100 mm. Holes 10 in such acoustic materials will typically be larger than in pvc film materials, the hole size typically ranging from 10 mm to 200 mm width or diameter, typically maintaining vision through a transparent substrate 16. The foam material is optionally coloured differently or imaged differently on each side to create a variety of vision control and/or decorative as well as acoustic control products. The overlaminate 30 optionally comprises pvc sheet, acrylic sheet, polycarbonate sheet or glass, for example Corning® Willow® Glass from Corning Glass, US.

A transparent material is one which allows an observer on one side of the material to focus on an object spaced from the other side of the material, for example glass or plastic sheet or filmic material, which is optionally "water clear" or tinted. Examples of suitable plastic base materials include polycarbonate, acrylic, pvc, polyester and co-polyester.

Figure 2A:
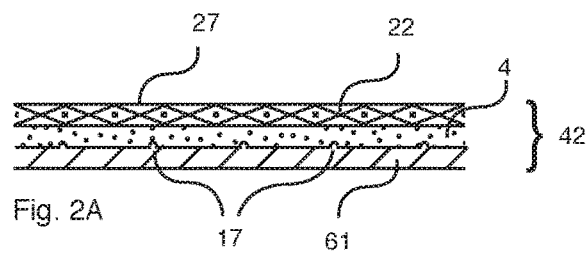
Figure 2B:
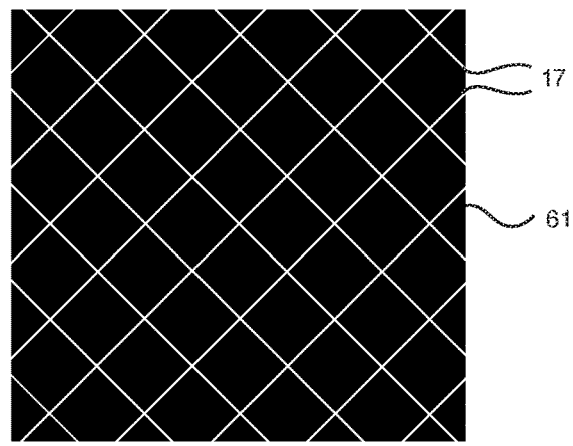
FIGS. 2B and 2D are diagrammatic plans of an embossed release liner.

FIG. 2A illustrates a self-adhesive assembly 42 comprising an embossed release liner 61, for example comprising a raised embossed pattern 17 according to U.S. Pat. No. 5,650,215, comprising interconnected elements, for example a raised grid embossed pattern 17 as shown in FIG. 2B, being a plan of embossed release liner 61. Pressure-sensitive adhesive layer 4 is in intimate contact with embossed release liner 61 and comprises recesses corresponding to embossed pattern 17. Face film 22 comprises imaging surface 27. An example self-adhesive assembly 42 comprises embossed paper release liner 61 with a silicone release coating, an acrylic-based solvent pressure-sensitive adhesive 4 and a polyvinyl chloride (pvc) face film 22. As one example of an embossed release liner, a nominal 120 g paper of thickness approximately 140 micron is embossed with a 45°, 1.2 mm×1.2 mm square grid as FIG. 2B. The embossed projection of embossed pattern 17 in this example is nominally 25 micron but is optionally less than 25 micron, 25-50 micron, or over 50 micron. The lines of the embossed pattern are optionally of width 10-25 micron, 25-50 micron, 50-75 micron or over 75 micron.

An optional variant of this method is the printing of the adhesive layer to a desired pattern, for example as illustrated in FIG. 2B, onto the film layer or release liner layer before forming the assembly and its perforation. In this non-limiting case, the inter-connected void network will be the full thickness of the adhesive layer.

Figure 2C:
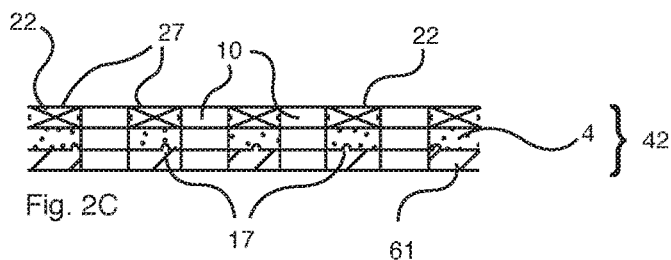
Figure 2D:
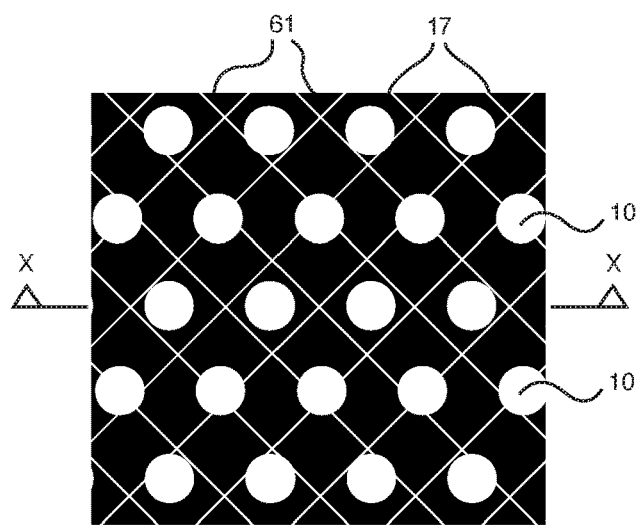

In FIG. 2C, the self-adhesive assembly 42 is perforated, for example by punch perforation or laser, to form a pattern of circular holes 10, for example in a 60° offset grid as shown in FIG. 2D, being a plan of embossed release liner 61 with perforation holes 10.

Figure 2E:
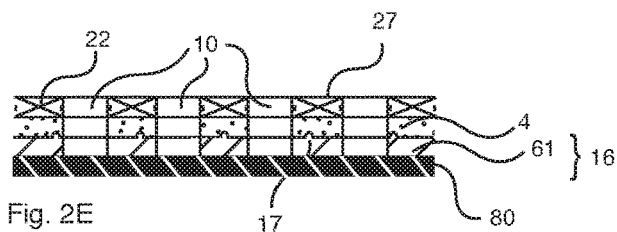

In FIG. 2E, optional non-perforated backing layer 80 is applied to perforated release liner 61 to form composite release liner 16. In FIG. 2F, the assembly of FIG. 1E is optionally imaged with design 14, for example by screen printing or inkjet printing.

Figure 2H:
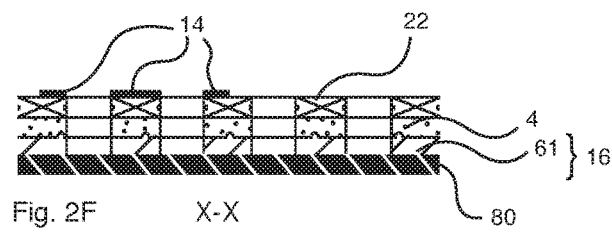
Figure 2H:
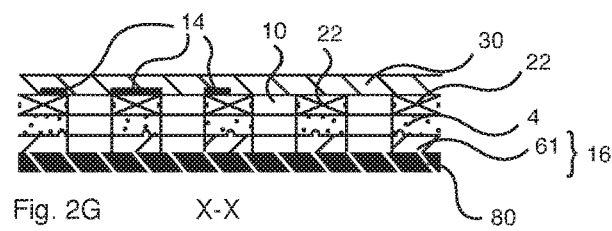
Figure 2H:
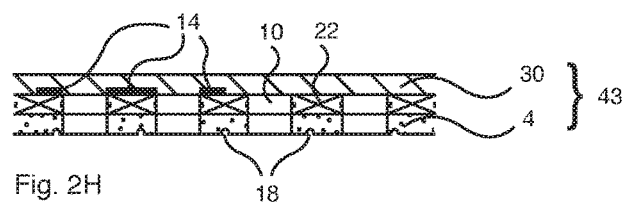
Figure 2I:
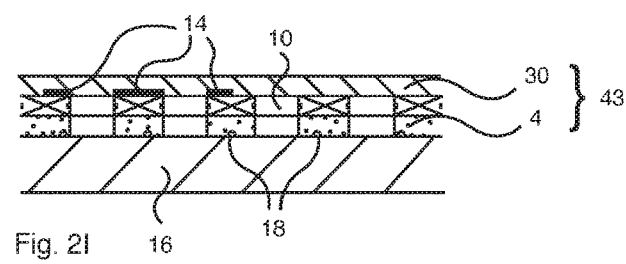
Figure 2J:
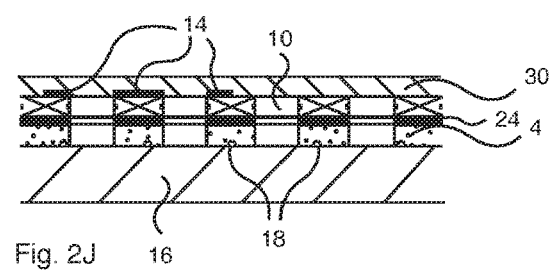
FIG. 2J is a diagrammatic illustration of a one-way vision panel of Type 2(i).

In FIG. 2G, overlaminate 30, for example of pvc or polyester, is applied to perforated film layer 22, for example by a layer of pressure-sensitive adhesive or heat-activated adhesive. In FIG. 2H composite liner 16 is removed to form remaining assembly 43 comprising recessed pattern 18 corresponding to embossed pattern 17. The remaining assembly 43 is applied in FIG. 2I to substrate 16, recesses 18 forming an inter-connected void network 90 with holes 10. Typically the adhesive is formulated to maintain the void network after application. The film layer and imaging optionally form a vision control panel according to US RE37,186 or U.S. Pat. No. 6,212,805. For example, FIG. 2J is similar to FIG. 2I except that the initial film layer and subsequent processing comprises a black or other light-absorbing layer or coating 24, for example a layer of black pvc or black ink bonded to a white pvc layer 21, to form a one-way vision panel according to US RE37,186.

Figure 3A:
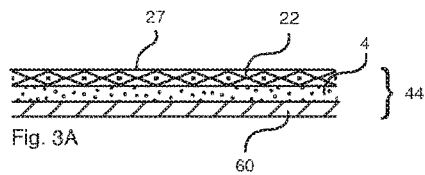
FIGS. 3A-H are diagrammatic cross-sections of the stages in production of a partially perforated assembly Type 2 made by method (ii).
Figure 3B:
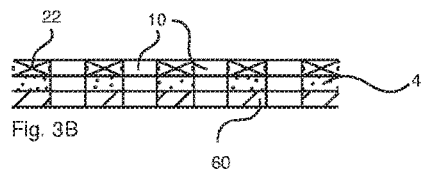
Figure 3C:
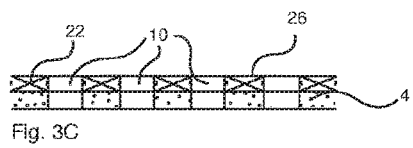
Figure 3D:
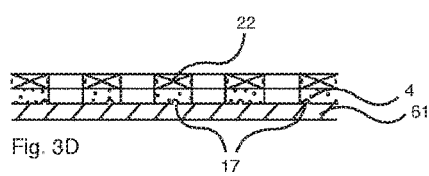
Figure 3E:
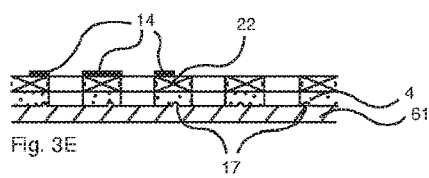
Figure 3F:
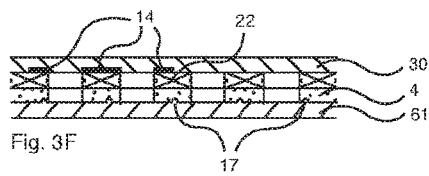
Figure 3G:
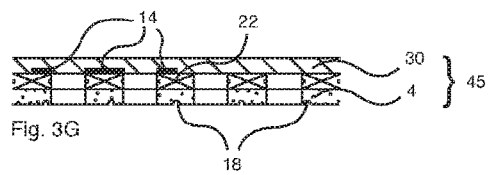
Figure 3H:
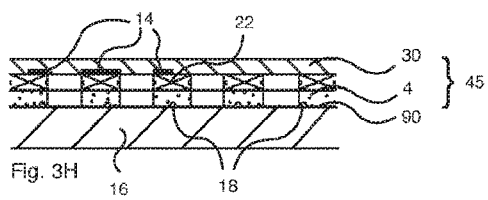
Figure 3I:
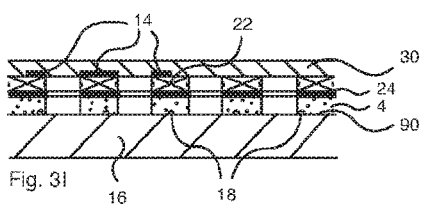
FIG. 3I is a diagrammatic illustration of a one-way vision panel of Type 2(ii).

FIG. 3A illustrates self-adhesive assembly 44 comprising face film 22 comprising imaging surface 27, pressure-sensitive adhesive layer 4 and release liner 60. The assembly 44 is perforated with a pattern of holes 10 in FIG. 3B. In FIG. 3C, perforated liner 60 has been removed and is replaced by embossed release liner 61 in FIG. 3D, for example comprising a raised grid embossed pattern 17 (or having any other pattern, for example as discussed below with respect to the inter-connected void network 90). The embossed pattern 17 is embedded within adhesive layer 4, typically by means of nip rollers. The assembly of FIG. 3D is optionally imaged with design 14 in FIG. 3E and overlaminate 30 is applied in FIG. 3F. Embossed release liner 61 is removed in FIG. 3G, leaving partially perforated assembly 45 with recessed pattern 18 corresponding to embossed pattern 17. In FIG. 3H, remaining assembly 45 has been applied to substrate 16, recesses 18 forming an interconnected void network 90 with holes 10. FIG. 3I is similar to FIG. 2J in illustrating one example of a vision control panel. The inter-connected void networks 90 of the embodiments described and illustrated above optionally comprise any rectangular, square or triangulated grid.

Figure 4A:
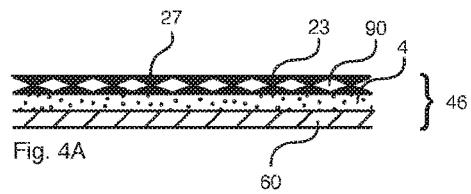
FIGS. 4A-G are diagrammatic cross-sections of the stages in production of a partially perforated assembly Type 3.
Figure 4B:
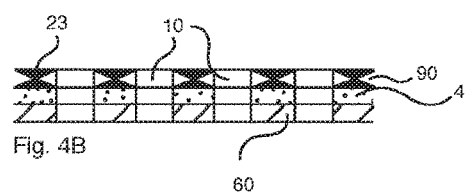
Figure 4C:
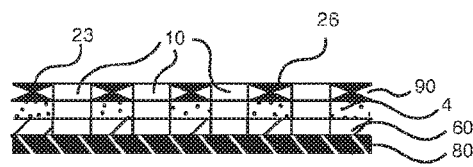
Figure 4D:
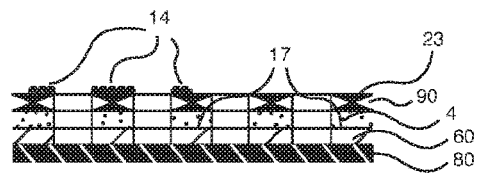
Figure 4E:
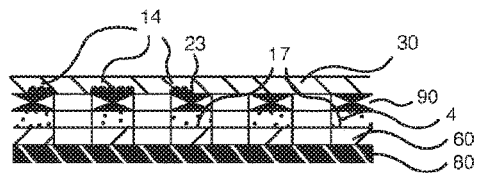
Figure 4F:
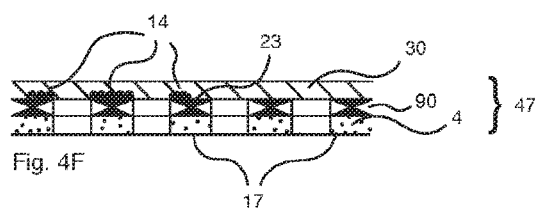

In FIG. 4A air-permeable film layer 23 is adhered to adhesive layer 4, which is adhered to liner 60 to form self-adhesive assembly 46. Air-permeable film layer 23 is optionally a non-woven fibrous material or a woven material or an inter-connected cellular material, an open cell foam or other material comprising inter-connected voids. Fibrous materials include natural and artificial fibres, including woven fibres, cotton fibres, mineral fibres, glass fibres, metallic wire or shavings, plastic fibres, for example polyester fibres. Film layer 23 is optionally sealed on each side, for example with a filmic layer on each side, for example of polypropylene. Such sealed fibrous materials are typically easier to punch, laser cut or blade cut with the required hole pattern 10. Cellular film layers optionally include square or hexagonal cellular materials, cell sides being typically air-permeable materials or with voids formed in the cell sides, optionally composite materials with non-porous layers to each side. Air-permeable film layer 23 optionally comprises gap-graded spherical or other solid shapes fused together with connected interstices forming the inter-connected void network 90. All three layers are perforated with holes 10 in FIG. 4B and optional additional liner 80 is adhered to perforated liner 60 in FIG. 4C. In FIG. 4D, optional image 14 is applied to film layer 23 and overlaminate 30 is applied to film layer 23 and optional image layer 14 in FIG. 4E. Composite liner-60 and 80 is removed in FIG. 4F and the remaining partially perforated assembly 47 is applied to substrate 16 in FIG. 4G. As an example of creating a vision control panel according to US RE37,186 or U.S. Pat. No. 6,212,805, air-permeable film layer 23 is processed throughout with light-absorbent layer 24, for example a black spray coating applied to air-permeable film layer 23, to form the one-way vision panel of FIG. 4H. The air-permeable film layer 23 provides a continuous inter-connected void network 90 allowing air to be transmitted, for example solar-heated hot air to the perimeter of a panel of the applied assembly, or to reduce temperature differential and thereby, for example, the likelihood of differential thermal expansion and consequent substrate failure, for example within the area of a glass window.

Different non-limiting embodiments overcome known problems or introduce novel advantages to vision control panels on windows. For example, the different types of inter-connected void networks may, according to various embodiments, enable the passage of solar-heated air to escape into the ambient atmosphere via an unsealed panel perimeter. Differential thermal expansion of window glass with the attendant risk of fracture is ameliorated or prevented by the migration of warmed air from one part of the panel to areas with cooler air.

Figure 4G:
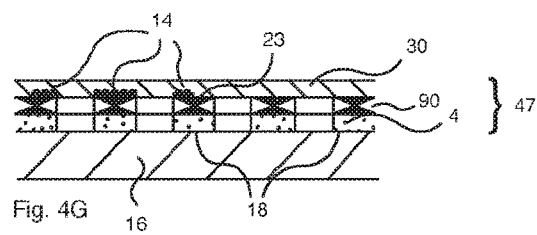
Figure 4H:
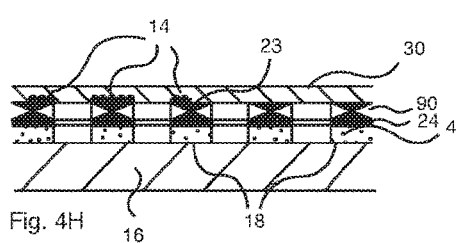
FIG. 4H is a diagrammatic illustration of a one-way vision panel of Type 3.

According to various embodiments, the energy of sound waves incident upon overlaminate 30 is dissipated by the deflection of one or more components of the remaining assemblies in FIGS. 1G, 2I, 3H and 4G, for example overlaminate 30, and lateral movement of air through the inter-connected air network in any of the embodiments in FIGS. 1G, 2I, 3H and 4G, owing to the mass of air moved against the friction of the void network surfaces. If air-permeable layer 23 in FIG. 4G is fibrous, sound energy will also be dissipated by the displacement of individual fibres through air movement and heat energy generated by adjacent fibres rubbing against each other, as is known in the behavior of prior art fibrous sound absorption materials.

Figure 5A:
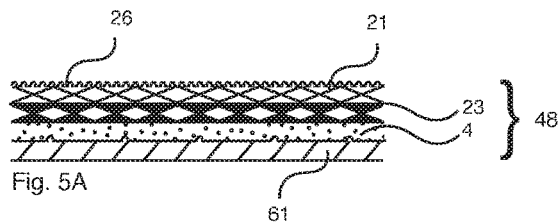
FIGS. 5A-5G are diagrammatic cross-sections of the stages in production of a partially perforated assembly comprising all three Types 1, 2 and 3 of creating an inter-connected void network.
Figure 5B:
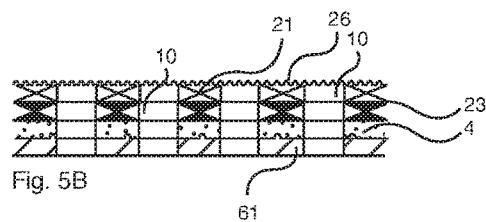
Figure 5C:
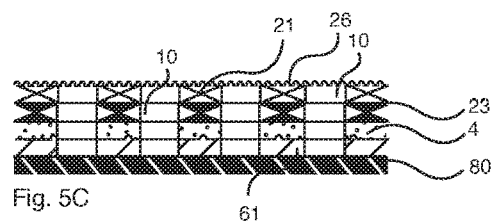
Figure 5D:
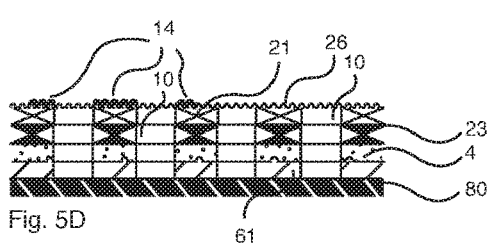
Figure 5E:
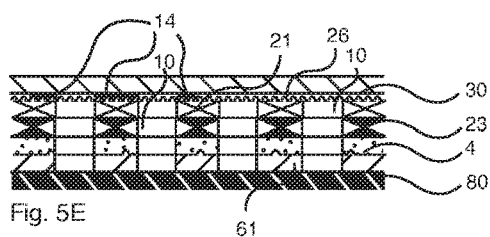
Figure 5F:
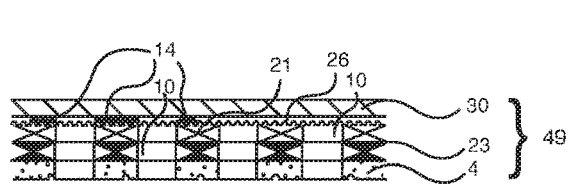
Figure 5G:
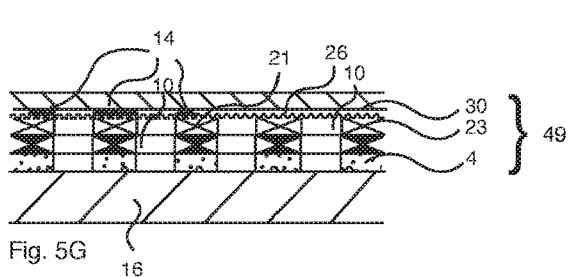

The previously described embodiments are optionally combined in any desired combination. For example, in the assembly 48 of FIG. 5A, embossed film layer 21 is bonded to air-permeable film layer 23 which is adhered to adhesive layer 4, which is adhered to embossed liner 61. All four layers are perforated with holes 10 in FIG. 5B. Additional liner 80 is applied to perforated embossed liner 61 in FIG. 5C and, in FIG. 5D, optional image 14 is applied to film layer 21 and overlaminate 30 is applied to film layer 21 and optional image 14 in FIG. 5E. Composite liner 61 and 80 is removed in FIG. 5F and the remaining assembly 49 is applied to substrate 16 in FIG. 5G. In this embodiment there are three layers of inter-connected voids, connected to each other via perforation holes 10, the first between embossed film layer 21 and overlaminate 30, the second within film layer 23 and the third between adhesive layer 4 and substrate 16.

It should be understood that as well as a pattern of perforation holes, various embodiments include any arrangement of film layer and adhesive layer that divides a panel into a plurality of discrete void areas, for example a pattern of parallel lines of a film layer adhered to adhesive layer 4 with discrete void areas or gaps 10 between the individual lines.

Figure 6A:
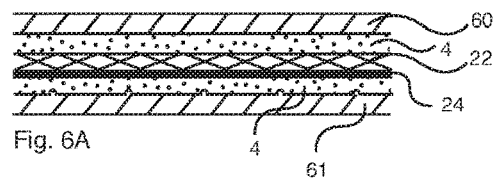
FIGS. 6A-6G are diagrammatic cross-sections of the stages in production of a partially perforated assembly Type 2 comprising a second adhesive layer and a non-adhesive overlaminate.
Figure 6B:
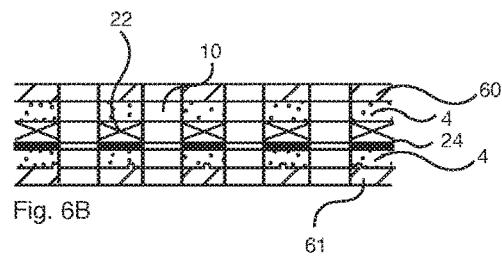
Figure 6C:
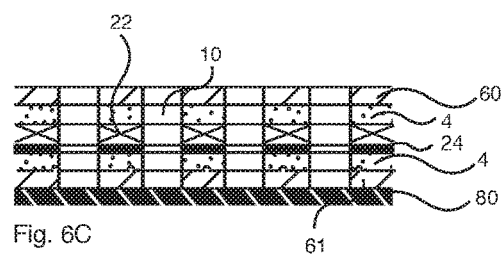
Figure 6D:
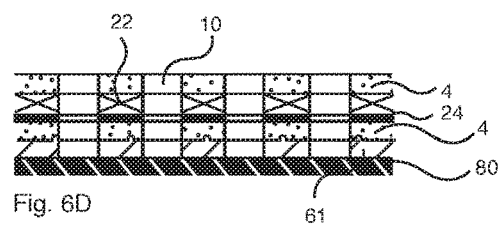
Figure 6E:
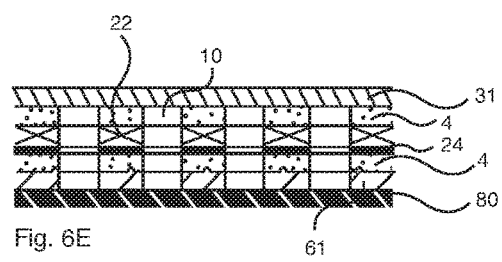
Figure 6F:
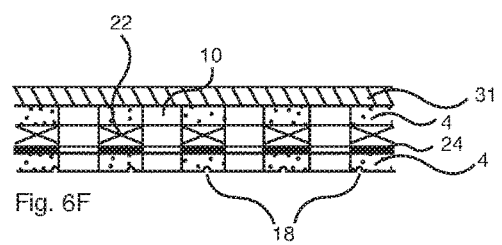
Figure 6G:
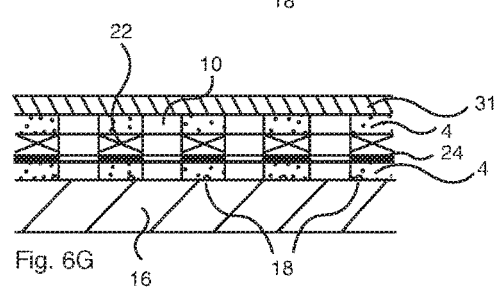

In any of the previously described and illustrated embodiments, a non-adhesive overlaminate 31 can be substituted for the overlaminate 30, which typically has a pressure-sensitive or heat-activated adhesive layer which may detract to some degree from the acuity of through vision of a vision control panel, for example as illustrated in FIGS. 1I, 2J, 3I or 4H. For example, a simple one-way vision panel comprising a white or other light-reflective film layer 22 bonded to a black or other light-absorbing film layer 24 optionally comprises pressure-sensitive adhesive layers 4 adhered to each of film layer 22 and film layer 24, with release liner 60 and embossed release liner 61 respectively, to form the assembly of FIG. 6A. All the layers are perforated with holes 10 as illustrated in FIG. 6B and optional additional liner 80 added in FIG. 6C. In FIG. 6D, perforated release liner 60 has been removed, to be replaced by non-adhesive overlaminate 31 in FIG. 6E, for example of pvc or polyester film or, more preferably, a thin flexible glass, for example Corning® Willow® Glass from Corning Glass, US. While plastic overlaminates can be coated to improve their chemical or scratch resistance, glass typically provides a better surface for cleaning and through vision (according to various non-limiting embodiments), when composite embossed release liner 61 and 80 are removed to leave the assembly of FIG. 6F, which is applied in FIG. 6G to substrate 16, for example a glass window or building partition. In this embodiment of FIG. 6G, the interconnected void network 18 is within the depth of the adhesive 4 and adjacent to substrate 16. Optionally or additionally, film layer 22 could be substituted by an air-permeable film layer 23, for example a sound absorptive material, for example to provide a building partition that provides a one-way vision and a significantly sound absorptive characteristic.

According to various edge-sealed embodiments, the perimeter/edge of the assembly is sealed so that the void network 90 is not in fluid communication with the ambient environment around the assembly. The edge seal may be formed, for example, by not embossing the void network 90 all the way to the edge of the assembly or a seal applied in liquid form. According to various such embodiments, edge-sealing discourages dirt, water, or other debris from infiltrating the void network 90 and holes 10 after the assembly is applied to a substrate (e.g., an exterior window or door or internal partition).

Alternatively, the edges of the assembly may remain unsealed. According to various embodiments, a non-edge sealed embodiment facilitates air communication between the holes 10 and the ambient environment via the void network 90, which may reduce air pressure within the holes 10 and/or allow hot air to more easily escape from the holes 10. Various non-edge-sealed embodiments are used in exterior or interior window, partition or door applications.

According to various embodiments, the void network 90 in any of these embodiments may form any pattern of voids/recesses/air passages, as viewed in plan (e.g., as shown in FIG. 2B). According to various edge-sealed or non-edge-sealed embodiments, the pattern of voids/recesses/air-passages fluidly interconnects the perforation holes 10 with each other to permit air movement between the interconnected holes 10. According to various non-edge-sealed embodiments, the pattern of the void network 90 may additionally and/or alternatively fluidly interconnects holes 10 with an edge of the assembly so as to permit air movement between the holes 10 and the ambient environment.

According to various non-limiting examples of non-edge-sealed assemblies, one or both ends of each recess/void/air-passage fluidly connect to an edge of the assembly.

According to various alternative embodiments, the void network 90 is formed by an air permeable layer in the assembly, for example, an air-permeable film layer.

According to various edge-sealed and non-edge-sealed embodiments, the void network 90 in any embodiment fluidly interconnects at least 2, 3, 5, 10, 20, 30, 50, 75, 100, 150, 200, 300, 400, 500, 1000, 2000, 3000, 4000, and/or 5000 perforation holes 10 of the assembly. According to various embodiments, the void network 90 fluidly interconnects at least 5%, 10%, 15%, 20%, 25%, 30%, 35%, 40%, 45%, 50%, 55%, 60%, 65%, 70%, 75%, 80%, 85%, 90%, 95%, 96%, 97%, 98%, 99%, and/or 100% of the perforation holes 10 of the assembly.

According to various embodiments (e.g., various non-edge-sealed embodiments), the void network 90 in any of the above-discussed embodiments fluidly connects at least 2, 3, 5, 10, 20, 30, 50, 75, 100, 150, 200, 300, 400, 500, 1000, 2000, 3000, 4000, and/or 5000 perforation holes 10 of the assembly with the ambient environment around the assembly. According to various embodiments, the void network 90 fluidly connects at least 5%, 10%, 15%, 20%, 25%, 30%, 35%, 40%, 45%, 50%, 55%, 60%, 65%, 70%, 75%, 80%, 85%, 90%, 95%, 96%, 97%, 98%, 99%, and/or 100% of the perforation holes 10 of the assembly with the ambient environment around the assembly. According to alternative embodiments, the edges/perimeter of the assembly are sealed so that the perforation holes 10 are not fluidly connected to the ambient environment around the assembly.

In some of the illustrated embodiments, the film layer or a release liner layer are embossed. However, according to alternative embodiments additional and/or alternative layers may be embossed to form void network(s). For example, according to an alternative embodiment, the side of the non-perforated overlaminate layer that faces toward the perforated film layer may be embossed in addition to or in the alternative to the embossing of the perforated film layer to form the void network(s). According to alternative embodiments, the void network 90 may be formed between the perforated film layer and the perforated adhesive layer, and may be disposed within the depth of either layer and/or both layers.

Various non-limiting embodiments have one or more advantages over the prior art. For example, according to various non-limiting embodiments, the inter-connected void network allowing the free passage of air, has several advantages including:

(i) the dissipation of heat caused by solar energy, providing the panel is not perimeter-sealed, for example is applied to a window leaving a small gap between its edges and any surrounding window frame.

(ii) the redistribution of air within a panel, for example to avoid or reduce differential thermal expansion of glass with an applied film assembly panel, which can lead to failure of the glass in certain conditions, for example if a panel has been imaged with adjacent areas of ink of substantially different reflectivity, for example a black or other dark, radiation-absorbing ink adjacent to a white or other radiation-reflective area of ink or one area of a panel is in direct sunlight while another area of the panel is in shade. Several failures of this nature having occurred in the past. The void network enables movement of expanding hot air to cooler areas within the void network, tending towards an equalization of temperature across a panel, whether the perimeter is unsealed or sealed.

According to various non-limiting embodiments, a flexible overlaminate and/or a compressible perforated adhesive underlayer in a partially perforated assembly applied to a window or other panel, for example a transparent or non-transparent partition in a building, has other potential benefits, for example in the absorption and dissipation of sound energy. Incident sound energy is absorbed and dissipated partly by the lateral movement of air within the void network and partly by the temporary deformation and recovery of the partially perforated assembly. In the third type of embodiment, illustrated in FIGS. 4A-4G, and the combined embodiment of FIGS. 5A-5G, the fibres or interconnected cell walls dissipate sound energy through friction of passing air and/or the deflection or vibration of the individual fibre or cell wall elements and/or interaction of individual fibres.

The resultant panel of any of FIGS. 1H, 2I, 3H, 4G, 5G and 6G comprising a glass or plastic substrate 16 comprises a sound absorption coefficient at a frequency of 1 kHz of greater than the transparent base material without the partially perforated assembly by more than 0.02, preferably more than 0.05, more preferably by more than 0.1 and even more preferably by more than 0.2. According to various embodiments, the sound absorption coefficient at a frequency of 1 kHz exceeds a corresponding sound absorption coefficient of a transparent substrate material 16 without the partially perforated assembly at a frequency of 1 kHz by (1) at least 0.02, 0.05, 0.1, 0.2, 0.3, 0.4, 0.5, 0.6, 0.7 and/or 0.8, and/or (2) less than 1.0, 0.9, 0.8, 0.6, 0.5, 0.4, and/or 0.03.

One or more of these sound-absorbing embodiments may have several advantages over the prior art sound absorbing panels comprising fibrous material behind a perforated sheet material, including:

(i) they comprise a continuous non-perforated overlaminate, which is easier to clean and less likely to harbor germs or other contaminants, and (ii) optionally comprise a light-permeable panel by virtue of a transparent or translucent overlaminate, a transparent or translucent substrate and the perforation holes in the film layer and the adhesive layer, and optionally provide a one-way vision or other vision control panel according to US RE37,186 or U.S. Pat. No. 4,925,705.

"Doming" and "dimpling" (giving the impression of a golf ball surface) overlaminate distortion within the area of individual circular perforation holes has been observed in prior art panels, which interferes with the quality of through vision of see-through graphic panels. This is apparently caused by factors in the overlaminating process (in which case squeegeeing to apply panels can also damage the "crown" of individual domes) or possibly by other factors during application or service conditions. Such visible distortion of the overlaminate affects the quality of through vision, if only by visually interfering reflections. Such visible distortions are beyond the elastic range of the overlaminate material and are irreversible in practice. According to various non-limiting examples of the first and third types of embodiments described herein, such distortions occurring in the overlaminating process are avoided and all three types may avoid such distortion caused during the application of the product to a window or in use, the inter-connected void network relieving any positive or negative pressure in the perforation holes causing such distortions.

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., any alterations within the spirit and scope of the following claims).

What is claimed is:

1. A partially perforated assembly comprising:
a perforated film layer having first and second sides and a plurality of perforations comprising at least a first perforation and a second perforation;
a perforated adhesive layer applied to the first side of said film layer, the perforated adhesive layer having a plurality of perforations comprising at least a first perforation and a second perforation;
a non-perforated overlaminate film layer on the second side of said perforated film layer; and
a release liner on a side of said perforated adhesive layer remote from said perforated film layer,
wherein the assembly is structured such that when the release liner is removed from the adhesive layer and the perforated film, perforated adhesive, and non-perforated overlaminate film layers of the assembly are adhered to a substrate by said adhesive layer, an interconnected void network within at least one of said perforated film, perforated adhesive, and non-perforated overlaminate film layers of said assembly allows passage of air from the first perforation in said film layer and the first perforation in said adhesive layer to the second perforation in said film layer and the second perforation in said adhesive layer,
wherein the assembly is structured such that when the release liner is removed from the adhesive layer and the perforated film, perforated adhesive, and non-perforated overlaminate film layers of the assembly are adhered to the substrate, the void network is formed in a depth of the perforated adhesive layer between the perforated adhesive layer and the substrate, and
wherein the release liner comprises an embossed release liner, and wherein the perforated adhesive layer comprises a perforated, pressure-sensitive embossed adhesive layer.

2. A partially perforated assembly comprising:
a perforated film layer having first and second sides and a plurality of perforations comprising at least a first perforation and a second perforation;
a perforated adhesive layer applied to the first side of said film layer, the perforated adhesive layer having a plurality of perforations comprising at least a first perforation and a second perforation;
a non-perforated overlaminate film layer on the second side of said perforated film layer; and
a release liner on a side of said perforated adhesive layer remote from said perforated film layer,
wherein the assembly is structured such that when the release liner is removed from the adhesive layer and the perforated film, perforated adhesive, and non-perforated overlaminate film layers of the assembly are adhered to a substrate by said adhesive layer, an interconnected void network within at least one of said perforated film, perforated adhesive, and non-perforated overlaminate film layers of said assembly allows passage of air from the first perforation in said film layer and the first perforation in said adhesive layer to the second perforation in said film layer and the second perforation in said adhesive layer,
wherein the assembly is structured such that when the release liner is removed from the adhesive layer and the perforated film, perforated adhesive, and non-perforated overlaminate film layers of the assembly are adhered to the substrate, the void network is formed in a depth of the perforated adhesive layer between the perforated adhesive layer and the substrate, wherein the perforated adhesive layer comprises a perforated, pressure-sensitive adhesive layer, and wherein the void network comprises a depression in the pressure-sensitive adhesive layer.

3. The assembly of claim 2, wherein said release liner is a perforated release liner, and wherein the depression in the pressure-sensitive adhesive layer is created by:

coating adhesive onto an embossed release liner, applying the adhesive-coated release liner to an unperforated film layer, and perforating the embossed release liner, the adhesive that was coated onto the embossed release liner, and the unperforated film layer to form the perforated release liner, the perforated adhesive layer, and the perforated film layer, respectively.

4. The assembly of claim 3, further comprising an additional non-perforated liner applied to the perforated release liner.

5. A partially perforated assembly comprising:

a perforated film layer having first and second sides and a plurality of perforations comprising at least a first perforation and a second perforation;

a perforated adhesive layer applied to the first side of said film layer, the perforated adhesive layer having a plurality of perforations comprising at least a first perforation and a second perforation;

a non-perforated overlaminate film layer on the second side of said perforated film layer; and a release liner on a side of said perforated adhesive layer remote from said perforated film layer, wherein the assembly is structured such that when the release liner is removed from the adhesive layer and the perforated film, perforated adhesive, and non-perforated overlaminate film layers of the assembly are adhered to a substrate by said adhesive layer, an interconnected void network within at least one of said perforated film, perforated adhesive, and non-perforated overlaminate film layers of said assembly allows passage of air from the first perforation in said film layer and the first perforation in said adhesive layer to the second perforation in said film layer and the second perforation in said adhesive layer, wherein the perforated film layer comprises a woven material.

6. A partially perforated assembly comprising:

a perforated film layer having first and second sides and a plurality of perforations comprising at least a first perforation and a second perforation;

a perforated adhesive layer applied to the first side of said film layer, the perforated adhesive layer having a plurality of perforations comprising at least a first perforation and a second perforation;

a non-perforated overlaminate film layer on the second side of said perforated film layer; and a release liner on a side of said perforated adhesive layer remote from said perforated film layer, wherein the assembly is structured such that when the release liner is removed from the adhesive layer and the perforated film, perforated adhesive, and non-perforated overlaminate film layers of the assembly are adhered to a substrate by said adhesive layer, an interconnected void network within at least one of said perforated film, perforated adhesive, and non-perforated overlaminate film layers of said assembly allows passage of air from the first perforation in said film layer and the first perforation in said adhesive layer to the second perforation in said film layer and the second perforation in said adhesive layer, wherein the perforated film layer comprises a cellular material with inter-connected cells.

7. A partially perforated assembly comprising:

a perforated film layer having first and second sides and a plurality of perforations comprising at least a first perforation and a second perforation;

a perforated adhesive layer applied to the first side of said film layer, the perforated adhesive layer having a plurality of perforations comprising at least a first perforation and a second perforation;

a non-perforated overlaminate film layer on the second side of said perforated film layer; and a release liner on a side of said perforated adhesive layer remote from said perforated film layer, wherein the assembly is structured such that when the release liner is removed from the adhesive layer and the perforated film, perforated adhesive, and non-perforated overlaminate film layers of the assembly are adhered to a substrate by said adhesive layer, an interconnected void network within at least one of said perforated film, perforated adhesive, and non-perforated overlaminate film layers of said assembly allows passage of air from the first perforation in said film layer and the first perforation in said adhesive layer to the second perforation in said film layer and the second perforation in said adhesive layer, wherein the perforated film layer comprises an acoustic foam material.

8. The assembly of claim 2, wherein the perforated film layer is imaged with a design.

9. The assembly of claim 8, wherein the assembly comprises a one-way vision assembly.

10. The assembly of claim 8, wherein the design comprises a see-through graphic upon removal of the release liner.

11. The assembly of claim 2, wherein the overlaminate film layer comprises an adhesive layer adhered to the perforated film layer or an image on the perforated film layer.

12. A method of making the partially perforated assembly of claim 2, the method comprising:

(i) perforating a first film layer and a first layer to form said perforated film layer and said perforated adhesive layer, and subsequently (ii) applying the non-perforated overlaminate film layer to the second side of the perforated film layer remote from the perforated adhesive layer.

13. The method of claim 12, wherein the assembly comprises the void network disposed between two of the layers of the assembly, the void network fluidly interconnecting the first and second perforations in the perforated film layer and fluidly interconnecting the first and second perforations in the adhesive layer.

14. The method of claim 12, further comprising:

embossing a surface of one of the first layers to form an embossed surface on one of the first layers before said applying of the non-perforated overlaminate film layer; and subsequently attaching the non-perforated overlaminate film layer to the perforated film layer.

15. The method of claim 14, wherein:
said embossing the surface of one of the first layers comprises embossing the first film layer, either before or after the first film layer is perforated to form the perforated film layer; and
in the assembly, the void network is located within the depth of the perforated film layer.

16. The method of claim 14, wherein said embossing comprises using an embossing roller to emboss the surface of the one of the first layers.

17. The method of claim 14, wherein said embossing comprises using an embossed release liner to form depressions in the perforated adhesive layer.

18. The method of claim 14, wherein said embossing comprises using an embossed release liner to form depressions in the first adhesive layer before the first adhesive layer is perforated to form the perforated adhesive layer.

19. The method of claim 18, wherein said using of an embossed release liner to form depressions in the first adhesive layer comprises coating adhesive onto the embossed release liner to form depressions in the first adhesive layer.

20. The method of claim 19, wherein the release liner of the assembly comprises the embossed release liner.

21. The method of claim 18, further comprising perforating the embossed release liner, the first film layer, and the first adhesive layer as a unit to form the perforated adhesive layer, the perforated film layer, and a perforated embossed release liner.

22. The method of claim 21, further comprising attaching a non-perforated additional liner to the perforated embossed release liner to form the release liner of the assembly.

23. The method of claim 12, wherein the assembly comprises an air-permeable film layer providing said interconnected void network.

24. The method of claim 23, wherein said air-permeable film layer comprises a sound-absorptive material.

25. The method of claim 24, wherein said sound-absorptive material is fibrous.

26. The method of claim 24, wherein said sound-absorptive material is an acoustic foam material.

27. The assembly of claim 2, wherein the void network fluidly interconnects at least 20 of said plurality of perforations in said film layer and fluidly interconnects at least 20 of said plurality of perforations in said adhesive layer.

28. The assembly of claim 2, wherein the void network fluidly interconnects at least 100 of said plurality of perforations in said film layer and fluidly interconnects at least 100 of said plurality of perforations in said adhesive layer.

29. The assembly of claim 2, wherein:
the release liner is an embossed, non-perforated release liner; and
the depression in the pressure-sensitive adhesive layer is created by:
coating adhesive onto a temporary release liner,
applying the adhesive-coated temporary release liner to an unperforated film layer,
perforating the temporary release liner, the adhesive that was coated onto the temporary release liner, and unperforated film layer to form a perforated temporary release liner, the perforated adhesive layer, and the perforated film layer, respectively, and
replacing the perforated temporary release liner with the embossed, non-perforated release liner, such that the embossed, non-perforated release liner is impressed into the perforated adhesive layer.

* * * * *